(12) United States Patent
Tyrewalla et al.

(10) Patent No.: US 11,797,418 B1
(45) Date of Patent: Oct. 24, 2023

(54) AUTOMATIC CREATION OF TRACE SPANS FROM LOG DATA

(71) Applicant: Amazon Technologies, Inc., Seattle, WA (US)

(72) Inventors: Nizar Tyrewalla, Seattle, WA (US); Jaana Dalgaard, Seattle, WA (US); Michael Gerhard Hausenblas, Seattle, WA (US); Niketan Kapila, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/643,154

(22) Filed: Dec. 7, 2021

(51) Int. Cl.
*G06F 11/00* (2006.01)
*G06F 11/34* (2006.01)
*G06F 11/07* (2006.01)
*G06F 11/30* (2006.01)

(52) U.S. Cl.
CPC ...... *G06F 11/3476* (2013.01); *G06F 11/0772* (2013.01); *G06F 11/3006* (2013.01); *G06F 11/3075* (2013.01)

(58) Field of Classification Search
CPC .............. G06F 11/323; G06F 11/3006; G06F 11/3476; G06F 11/3072; G06F 11/321
See application file for complete search history.

(56) References Cited

U.S. PATENT DOCUMENTS

| 11,250,069 B1 * | 2/2022 | Bianchi | G06F 16/904 |
|---|---|---|---|
| 11,388,211 B1 * | 7/2022 | Breeden | G06F 16/24568 |
| 2022/0121628 A1 * | 4/2022 | Devaraj | G06F 16/1824 |

* cited by examiner

*Primary Examiner* — Charles Ehne
(74) *Attorney, Agent, or Firm* — Knobbe, Martens, Olson & Bear, LLP (57) ABSTRACT

The present disclosure generally relates to systems and methods for the automatic creation of trace data. A trace generation service generates a trace identifier that will be utilized by a plurality of network services. Individual network services generate log data corresponding to execution of the network-based service. Individual log event in the log data includes information associated with a trace identifier generated by a network-based service during execution of the service. The trace generation service processes the log data based on trace identifiers to identify individual trace span associated with the generated unique trace identifier. The trace generation service constructs trace data associated with the generated unique trace identifier based on the identified trace span data.

23 Claims, 5 Drawing Sheets

AUTOMATIC CREATION OF TRACE SPANS FROM LOG DATA

BACKGROUND

Generally described, computing devices and communication networks can be utilized to exchange data and/or information. In a common application, a computing device can request content from another computing device via the communication network. For example, a user having access to a computing device can utilize a software application to request content or access network-hosed applications/functionality from a computing device via the network (e.g., the Internet). In such embodiments, the user's computing device can be referred to as a client computing device and the network-based computing device can be referred to as a service provider. Additionally, the client computing device can collect or generate information and provide the collected information to a network-based computing device for further processing or analysis.

In some embodiments, the network service provider can generate or provide information characterizing or related to how the network resources (e.g., components) are operating, executing, and performing. In the context of network-based services the generate information can provide insight or metrics related to how requests across multiple network-based services. Generally described, individual data, or a smallest unit, can be referred to as trace span data or trace span information. A collection of trace span data can be referred to generally as a trace data.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Aspects of the present disclosure relate to systems and methods for the automatic creation of trace data. More specifically, one or more aspects of the present application correspond to the utilization of simplified logging functionality in network-based services for collection of trace span data. To simply the collection of trace span data, a trace generation service generates a trace identifier that will be utilized by a plurality of network services. Individual network services generate log data corresponding to execution of the network-based service including individual log event in the log data associated with a trace identifier generated by a network-based service during execution of the service. The trace generation service accesses and processes the log data based on trace identifiers to identify individual trace span associated with the generated unique trace identifier. The trace generation service constructs trace data associated with the generated unique trace identifier based on the identified trace span data.

Some network-based service architectures, such as microservice-based service architecture, can implement a plurality of loosely coupled services that can provide functionality for execution of software application. Distributed tracing, sometimes called distributed request tracing, is a method to monitor applications built on a microservices architecture. In the context of network-based services, tracing functionality provides a tracing service the ability to troubleshoot and identify performance issues that can impact the performance of network applications, such as bottlenecks, bugs/flaws, errors, and other issues that impact the application's performance. As the number of services hosted by a service provider increases, the complexity of providing tracing functionality increases.

Generally, traditional, individual service metrics and logs by themselves fail to provide sufficient information for purposes of generating trace data. Both logs and traces help in debugging and diagnosing issues. A log can be defined as a set of specific timestamped events that are recorded for possible future analysis. Logs capture the state of the application and are the most basic form of monitoring. Tracing is more applicable to capture information about processing requests spanning multiple services, such as microservices. For example, trace data can be processed, such as by a trace service, to determine the length of time, which components interacted, latencies during each, errors that occurred and the like. Traditional collection of trace span data by network services for use by trace data processing services typically require custom trace span collection agents or other implementation of custom software during execution of the network service. This approach can be deficient, especially in requiring a higher level of knowledge of interfaces and protocols to implement trace collection agents and maintenance. Additionally, traditional approaches to utilization of trace collection agents may not be available, such in operating environment that do not allow or are not configured for runtime implementation.

To address at least a portion of the above-described deficiencies, one or more aspects of the present application correspond to systems and methods for utilizing trace identifier that can be utilized to store metric data corresponding to trace span data as log event data. Illustratively, the log event data can include a time of execution, characterization of success, reasons for error, or network service meta-data, and the like. As described above, individual log event data can correspond to a smallest unit of data utilized to implement trace functionality, which is referred to as trace span data or trace span information. A collection of trace span data can be referred to generally as a trace data.

To simply the collection of trace span data, a trace generation service generates a trace identifier that will be utilized by a plurality of network services. Individual network services generate log data corresponding to execution of the network-based service including individual log event in the log data associated with a trace identifier generated by a network-based service during execution of the service. The trace generation service accesses and processes the log data based on trace identifiers to identify individual trace span associated with the generated unique trace identifier. The trace generation service constructs trace data associated with the generated unique trace identifier based on the identified trace span data.

Although aspect of the present application will be described with regard to illustrative network components, interactions and routines, one skilled in the relevant art will appreciate that one or more aspects of the present application may be implemented in accordance with various environments, system architectures, computing device architectures and the like. Additionally, the examples are intended to be illustrative in nature and should not be construed as limiting.

Figure 1:
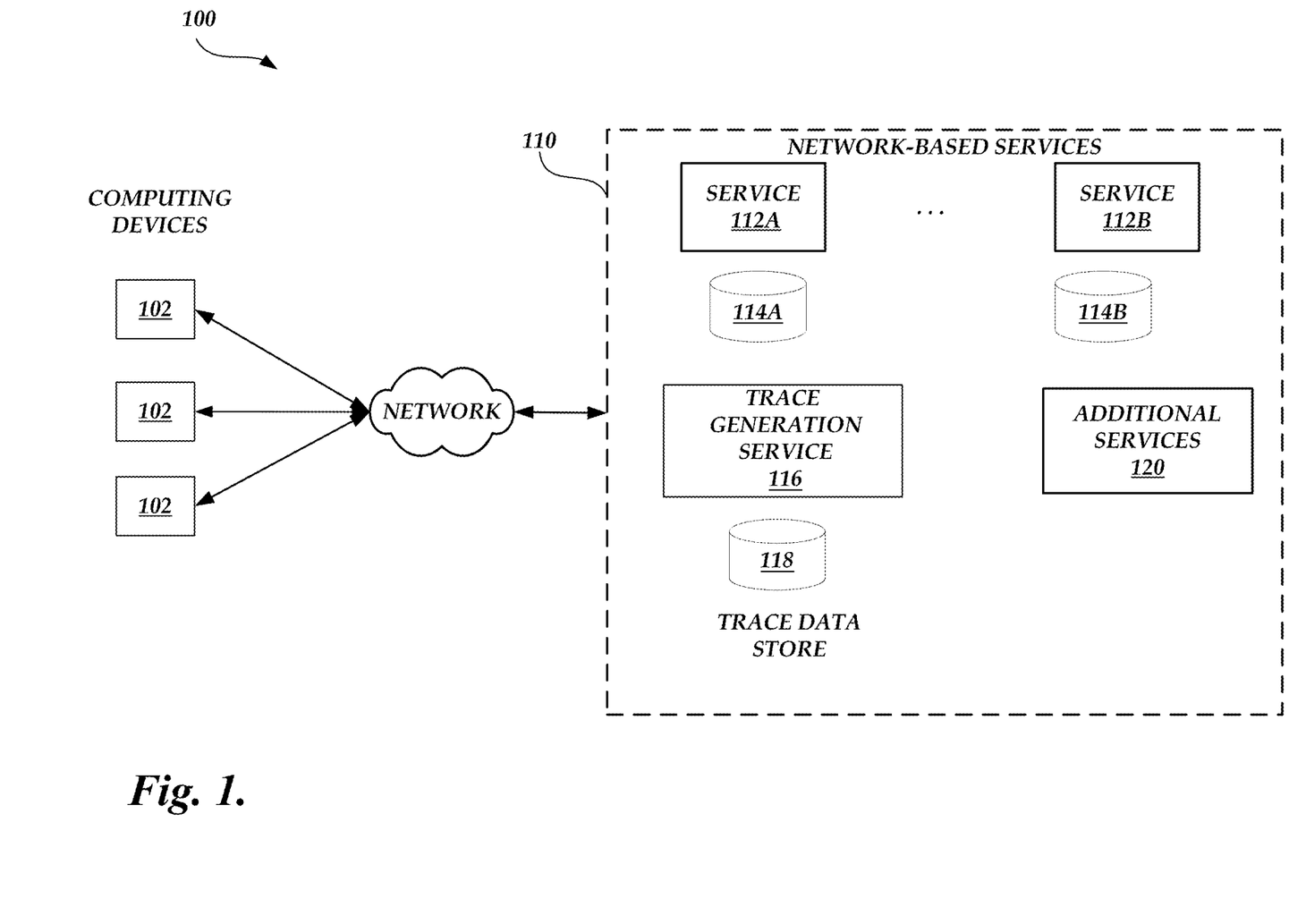
FIG. 1 is a block diagram depicting an illustrative system for implementing a network service for creating trace data according to one or more aspects of the present application.

FIG. 1 depicts a block diagram of an embodiment of the system 100. The system 100 can comprise a network, the network connecting a number of computing devices 102 and a network-based service component 110. Illustratively, the various aspects associated with the network-based service component 110 can be implemented as one or more components that are associated with one or more functions or services. The components may correspond to software modules implemented by one or more computing devices, which may be separate stand-alone computing devise. Accordingly, the components of the network-based service component 110 should be considered as a logical representation of the service, not requiring any specific implementation on one or more computing device.

The network 106 depicted in FIG. 1 connects the devices and modules of the system. The network can connect any number of devices. In some embodiments, a network service provider provides network-based services to client devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to variable load. The concept of "cloud computing" or "network-based computing" can thus be considered as both the applications delivered as services over the network and the hardware and software in the network service provider that provide those services. In some embodiments, the network may be a content delivery network.

The computing devices 102 in FIG. 1 can connect to the network and the network-based service component 110. The computing devices can be configured to transmit a request to the network-based service component 110 to illustratively access one or more network-based services using a communication protocol. For purposes of the present application, the initiation and subsequent processing of the communication requests by computing devices 102 and the network-based service component 110 will be described. The computing devices 102 are configured to have at least one processor. That processor can be in communication with memory for maintaining computer-executable instructions. The computing devices 102 may be physical or virtual. The computing devices may be mobile devices, personal computers, servers, or other types of devices. The computing devices may have a display and input devices through which a user can interact with the user-interface component. In some embodiments, the computing devices 102 have stored in memory the programs and instructions necessary to configured TLS pinning criteria as described herein.

Illustratively, the network-based service component 110 can include a plurality of network-based services that can provide functionality responsive to configurations/requests transmitted by the client computing devices 102, such as in the implementation of a set of microservices that are configured to provide underlying functionality to applications hosted by a service provider. As illustrated in FIG. 1, the network-based services include as set of network-based services 112A, 112B, etc. Illustratively, each network-based service can have a defined functionality, which facilitates a loose configuration for support of software applications. Each network-based service is an associated with a data store 114A, 114B, etc. that will be illustratively configured to receive and maintain log files related to the execution of the individual service 112. The log file/log data is made up of individual log event data. As will be described, in some embodiments, individual log event data may correspond to metrics corresponding to trace span data that are written to the log. This may be achieved without requiring custom functionality, such as agents. The depiction of the services 112 and data stores 114 are illustrative in nature and are not intended to depict any required particular architectural configuration, type of computing device or interconnection between devices.

Figure 2:
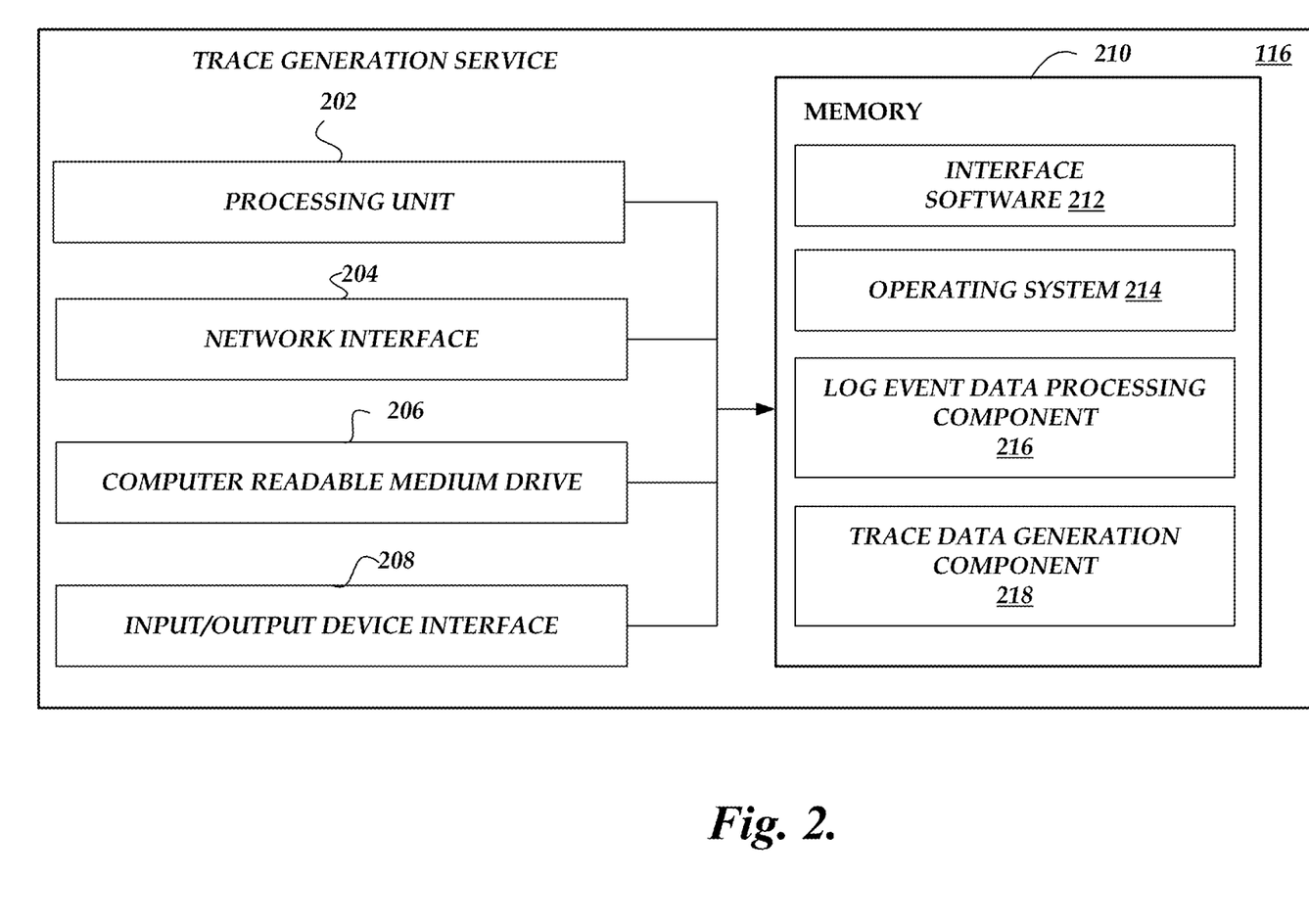
FIG. 2 is a block diagram illustrative of components of a trace generation service in accordance with aspects of the present application.

The network service 110 further includes a trace generation service 116 that represent the various functionality and additional networking components that the network-based service 110 to automatically create trace data from trace span data collected from log data generated by individual services 112. Illustrative components of the trace generation service 116 is depicted in FIG. 2. The trace generation service 116 is associated with a trace data store 118 for maintaining the trace data constructed from the trace span data.

The network service 110 further includes one or more additional services 120. Illustratively, the additional services 120 include trace processing services or other services that may request, receive or access trace data distributed or made available by the trace generation service 116. The additional services 120 may be hosted as part of network-based services 110 or may be an independent service hosted separately or a by a third party.

FIG. 2 depicts one embodiment of an architecture of an illustrative server for implementing the trace generation service 116 as described. The general architecture of the trace generation service 116 depicted in FIG. 2 includes an arrangement of computer hardware and software components that may be used to implement aspects of the present disclosure. As previously discussed, the components of the trace generation service 116 may include physical hardware components, one or more virtualized components or a combination thereof. Additionally, the components of the trace generation service 116 or the functionality attributed by the interface component service may be implemented in a virtualized environment. Such virtualized environments may be provided by the manufacturer or by a third-party entity, such as a computing service provider that can instantiate software modules that may be persistent or temporary in nature for purposes of implementing the functionality depicted in the illustrative architecture for the trace generation service 116.

As illustrated, the trace generation service 116 includes a processing unit 202, a network interface 204, a computer readable medium drive 206, and an input/output device interface 208, all of which may communicate with one another by way of a communication bus. The components of the trace generation service 116 may be physical hardware components or implemented in a virtualized environment.

The network interface 204 may provide connectivity to one or more networks or computing systems, such as the network 106 of FIG. 1. The processing unit 202 may thus receive information and instructions from other computing systems or services via a network. The processing unit 202 may also communicate to and from memory 210 and further provide output information for an optional display via the input/output device interface 208 In some embodiments, the trace generation service 116 may include more (or fewer) components than those shown in FIG. 2.

The memory 210 may include computer program instructions that the processing unit 202 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the trace generation service 116. The memory 210 may further include computer program instructions and other information for implementing aspects of the present disclosure. For example, in one embodiment, the memory 210 includes a log event data processing component 216 that is configured to obtain log event data from individual services 112. The memory 210 further includes a trace data generation component 218 that is configured to implement a trace generation or trace management routine as described herein.

Figure 3:
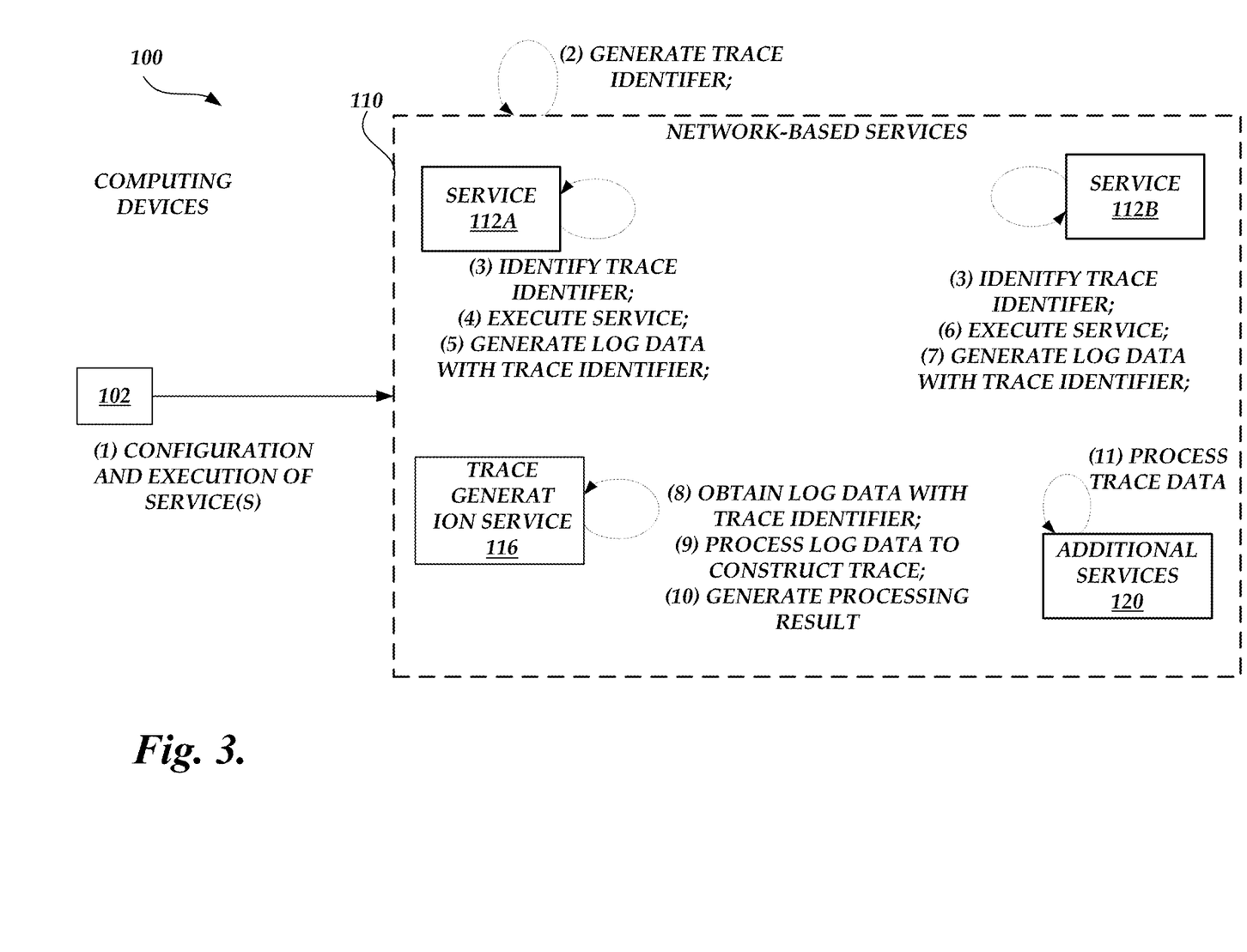
FIG. 3 is a block diagram of the system of FIG. 1 illustrating various interactions of the components related to the generation of trace data from event logs.

Turning now to FIG. 3, illustrative interactions of the components of the system 100 will be described. For purposes of the illustration, it can be assumed that a network-based service component 110 has been configured in a manner to implement a plurality of network services 112 on behalf of a customer. The present application is not intended to be limited to any particular type of services or that the number of individual services that may be accessed or generate processing results as part of an execution of an application on behalf of customers.

At (1), a customer configures the execution of the services from the network-based services 110. Illustratively, the configuration of the services includes the generation of log data including the generating of metric data corresponding to trace span data. Illustratively, the metric data includes, but is not limited to, can include a time of execution, characterization of success, reasons for error, or network service meta-data, and the like. As described above, the configuration of the network services does not require the detailed knowledge of the trace processing service 120, custom development kits, programming interfaces and is generally compatible with runtime execution.

At (2), the network service 110 obtains or generates a trace identifier. Illustratively, the trace identifier can be made up of a number of portions and can include a combination of unique and non-unique information. A first portion corresponding a unique numeric identifier that will be common to a set of services that will generate log event data for use as trace span data. In some embodiments, the trace identifier may be generated by the trace generation service 116. In other embodiments, the trace identifier may be generated by individual network services. In this embodiment, the one or more network services may correspond to a workflow or hierarchy such that a first individual network service 112 may generate the trace identifier and transmit the generated trace identifier to the other network services. Accordingly, aspects of the present application are not limited to the generation of the trace identifier by any particular component of the network service 110. . As described herein, the trace identifier may be common to a set of services to allow the trace processing service to generate trace span from a plurality of log data.

At (3), a first service and a second service illustratively receive or otherwise generate the trace identifier, such as in a configuration, publication, transmission, and the like. At (4), the first service executes the first service. At (5), the first service 112A generates log event data in accordance with established log commands that are not unique to trace span data (e.g., standard log commands). Illustratively, first service does not have to have any specific software code to collect and transmit trace span data for the trace generation service 116. Rather the first network service 112A can generate log data that includes, but is not limited to, trace span data or information that will form trace span data. In that regard, the first network service 112A can also generate additional log data utilizing the same commands or data structures that corresponds to log event data that will not be considered trace span data or will not otherwise be utilized to form trace span data. Thus, the first network service 112A does not need to include additional functionality or executable code that filters or otherwise distinguishes between log event data that corresponds to trace span data and log event data that does not correspond to trace span data. Additionally, the first network service 112A does not need to maintain or separate the log event data. As will be explained in greater detailed, the trace generation service 116 will further process the log event data to extract trace span data and construct the trace data from individual log data.

Illustratively, the log event data can include various types of information. In one aspect, the log event data can include the trace identifier that is common to the set of network services generating trace span data. Additionally, the log event data can include meta-data or descriptive data, such as a service identifier for the individual service that is being executed and generating the trace span data. Additionally, the meta-data or descriptive data can include timing information associated with the execution of a service that corresponds to the log event data. The service identifier and the timing information is illustratively not common to all network services. The timing information includes a start time of execution and an end time of execution. The individual log event data can correspond to any metric or information that can be considered part of trace span data, including, but not limited to, a resource identifier, time of execution, characterization of success, reasons for error, or any other network service meta-data.

At (6), the second service executes the second service. At (7), the second service generates log event data in accordance with establish log commands that are not unique to trace span data (e.g., standard log commands). In a similar manner as described above, the second service does not have to have any specific software code to collect and transmit trace span data for the trace generation service 116. Rather, the second network service 112B can generate log data that includes, but is not limited to, trace span data or information that will form trace span data. In that regard, the second network service 112B can also generate additional log data utilizing the same commands or data structures that corresponds to log event data that will not be considered trace span data or will not otherwise be utilized to form trace span data. Thus, the second network service 112B does not need to include additional functionality or executable code that filters or otherwise distinguishes between log event data that corresponds to trace span data and log event data that does not correspond to trace span data. Additionally, the second network service 112B does not need to maintain or separate the log event data. As will be explained in greater detailed, the trace generation service 116 will further process the log event data from the second network service to further construct the trace data.

As described above, the log event data can include various types of information. In one aspect, the log event data can include the trace identifier that is common to the set of network services generating trace span data. Additionally, the log event data can include meta-data or descriptive data, such as a service identifier for the individual service that is being executed and generating the trace span data. Additionally, the meta-data or descriptive data can include timing information associated with the execution of a service that corresponds to the log event data. The service identifier and the timing information is illustratively not common to all network services. The timing information includes a start time of execution and an end time of execution. The individual log event data can correspond to any metric or information that can be considered part of trace span data, including, but not limited to, a resource identifier, time of execution, characterization of success, reasons for error, or any other network service meta-data.

At (8), the trace generation service 116 obtains the log data from the services 112A, 112B. Illustratively, the trace generation service 116 may request log data from individual services 112. In some embodiments, the trace generation service 116 may transmit individual requests and receive the log data directly from individual services. In another embodiments, the trace generation service 116 may transmit batch requests or a general request that is processed by the network service 110, such as service management component. In other embodiments, individual services 112 may also be configured to periodically transmit log data or make log data available, such as based on time or other criteria. For example, individual services 112 may transmit log data to a network-based storage service or component that provides access to log data to the trace generation service 116. Accordingly, aspects of the present application are not limited to any particular form of methodology for providing log data from the services 112 to the trace generation service 116.

At (9), the trace generation service processes the log data to construct the trace data. Illustratively, the trace generation service can filter the log data according to trace identifier. Each filtered log event data can then correspond to trace span data. In some embodiments, the trace generation service 116 can conduct additional processing, including data averaging, normalization and the like. The trace generation service then constructs the trace data as the collection of trace span data.

At (10), the trace generation service 116 generates a processing result, such as distribution of the trace data, publication of the trace data, generation of notifications, and the like. At (11), the additional services 120 processes the trace data.

Figure 4:
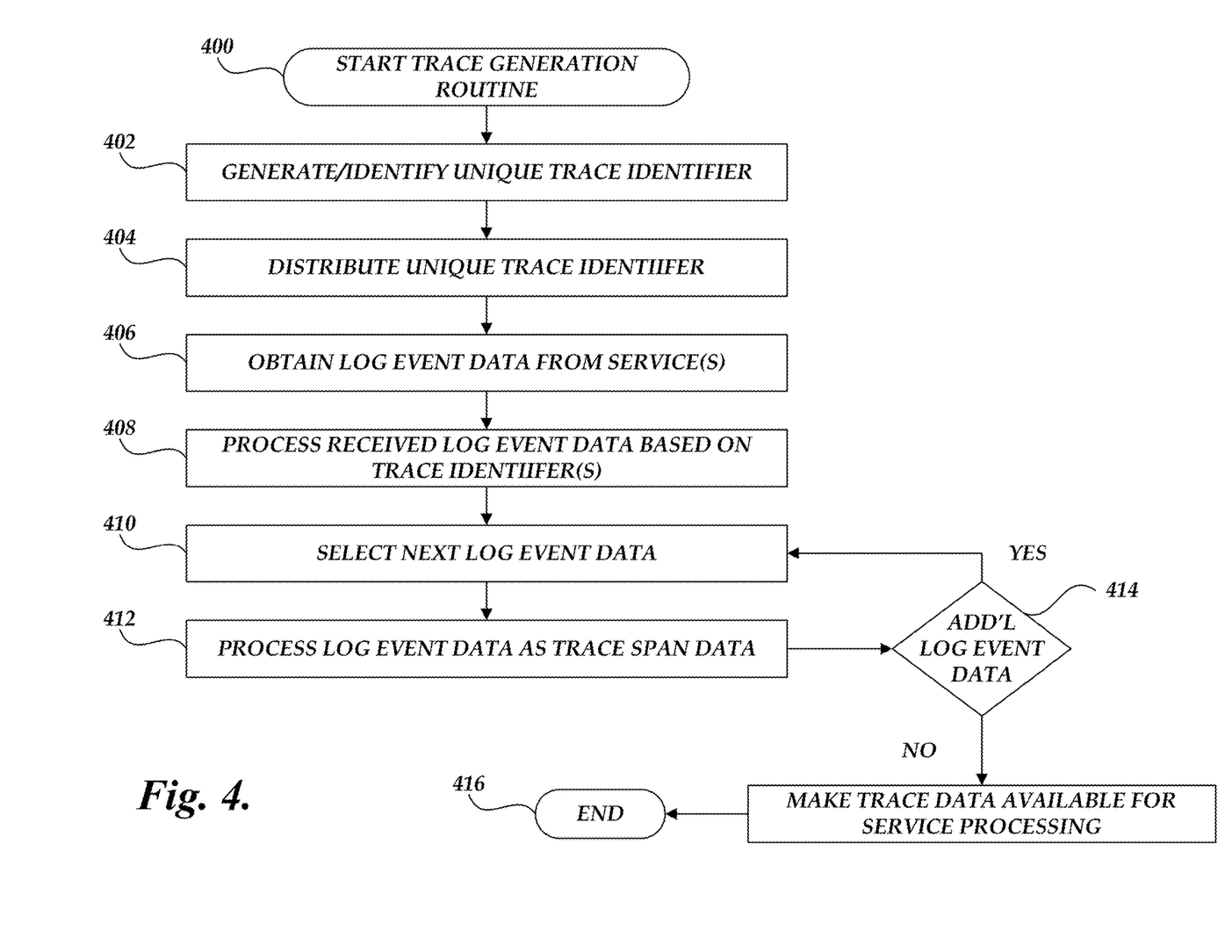
FIG. 4 is a flow diagram depicting an example routine for trace generation in accordance with aspects of the present application.

Turning now to FIG. 4, a routine 400 for trace generation will be described. Routine 400 is illustratively implemented by the trace generation service 116. At block 402, the trace generation service generates a trace identifier. Illustratively, the log information can be made up of a number of descriptive portions in addition to the trace span data that is generated. A first portion corresponding a numeric identifier, a second portion corresponding to a service identifier; and a third portion corresponding to timing information associated with the execution of a service. Illustratively, the numeric identifier included in the first portion of the generated unique trace identifier is common to all network services. The service identifier in the second portion and the timing information in the third portion is not common to all network services and can be unique information (including numeric or alphanumeric characters). The timing information included in the third portion includes a start time of execution and an end time of execution. As described herein, the trace identifier may be common to a set of services to allow the trace processing service to generate trace span from a plurality of log data. As previously described, in some embodiments, the trace identifier may be generated by a service 112 and block 402 may be omitted.

At block 404, the service distributes the unique trace identifier. Illustratively, one or more services receive the trace identifier, such as in a configuration, publication, transmission, and the like. Illustratively, the services that receive the trace identifier execute the services and generate data. As also described above, in some embodiments, the services 112 may generate the trace identifier.

At block 406, the trace generation service 116 obtains the log data. Illustratively, the trace generation service 116 may request log data from individual services 112. In some embodiments, the trace generation service 116 may transmit individual requests and receive the log data directly from individual services. In another embodiments, the trace generation service 116 may transmit batch requests or a general request that is processed by the network service 110, such as service management component. In other embodiments, individual services 112 may also be configured to periodically transmit log data or make log data available, such as based on time or other criteria. For example, individual services 112 may transmit log data to a network-based storage service or component that provides access to log data to the trace generation service 116. Accordingly, aspects of the present application are not limited to any particular form of methodology for providing log data from the services 112 to the trace generation service 116.

At block 408, the trace generation service 116 processes the log data to construct the trace data. Illustratively, the trace generation service can filter the log data according to trace identifier. Each filtered log event data can then correspond to trace span data. The trace generation service then constructs the trace data as the collection of trace span data. At decision block 414, the routine 400 checks for additional data.

At block 412, the trace generation service 116 generates a processing result, such as distribution of the trace data, publication of the trace data, generation of notifications, and the like. At block 416, the additional services 120 processes the trace data.

Figure 5:
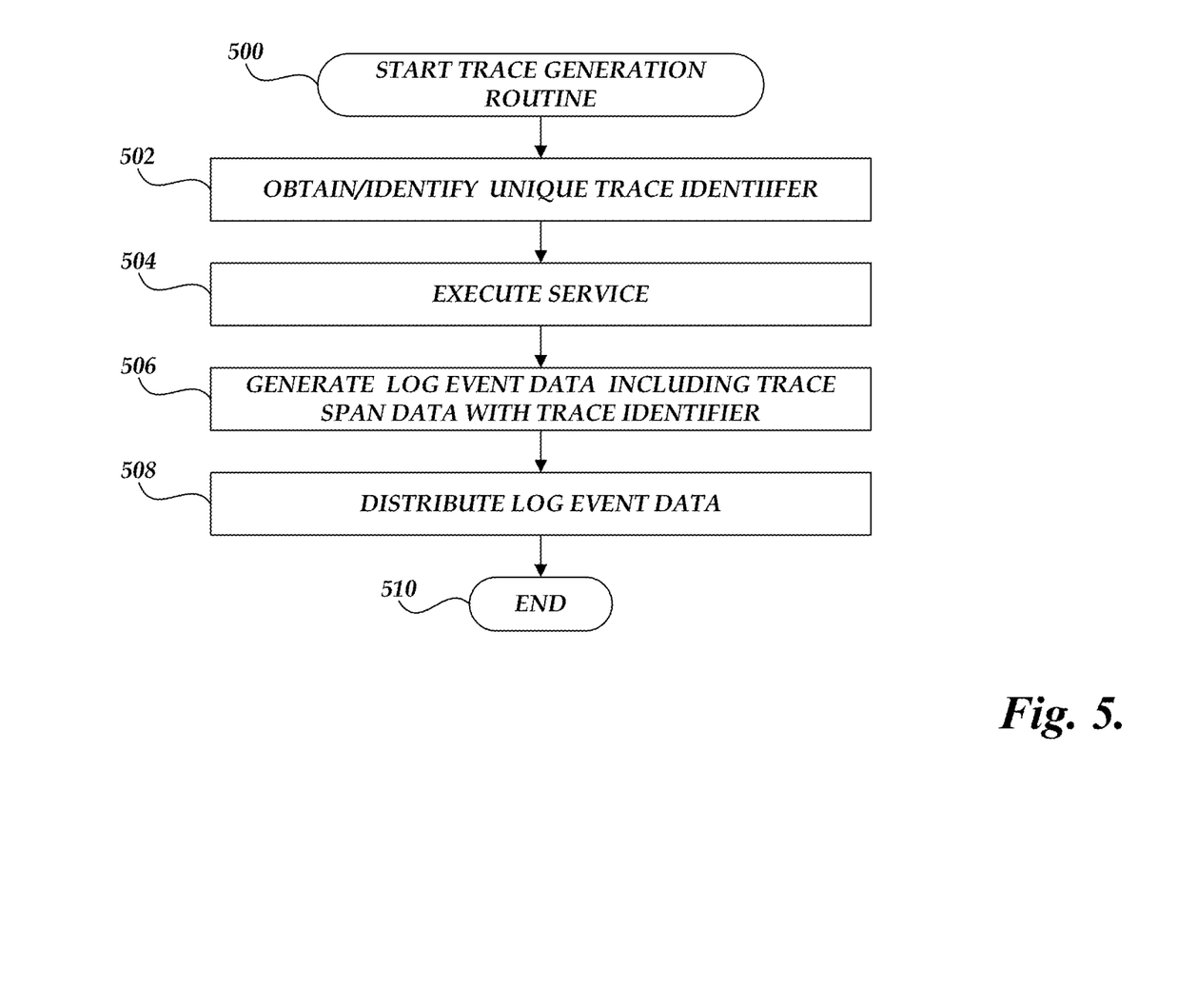
FIG. 5 is a flow diagram depicting an example routine for generating log data including trace span data in accordance with aspects of the present application.

FIG. 5 is a flow diagram of a routine 500 implemented by individual services to use log event commands to write log data. At block 502, the services receive or generate the trace identifier. At block 504, the services execute the service.

At block 506, the services generate log event data in accordance with establish log commands that are not unique to trace span data (e.g., standard log commands). As described above, the individual services do require any specific software code to collect and transmit trace span data for the trace generation service 116. Rather, the services can generate log data that includes, but is not limited to, trace span data or information that will form trace span data. In that regard, the services 112 can also generate additional log data utilizing the same commands or data structures that corresponds to log event data that will not be considered trace span data or will not otherwise be utilized to form trace span data. Thus, the services do not need to include additional functionality or executable code that filters or otherwise distinguishes between log event data that corresponds to trace span data and log event data that does not correspond to trace span data. Additionally, the services 112 do not need to maintain or separate the log event data.

Illustratively, the log event data can include various types of information. In one aspect, the log event data can include the trace identifier that is common to the set of network services generating trace span data. Additionally, the log event data can include meta-data or descriptive data, such as a service identifier for the individual service that is being executed and generating the trace span data. Additionally, the meta-data or descriptive data can include timing information associated with the execution of a service that corresponds to the log event data. The service identifier and the timing information is illustratively not common to all network services. The timing information includes a start time of execution and an end time of execution. The individual log event data can correspond to any metric or information that can be considered part of trace span data, including, but not limited to, a resource identifier, time of execution, characterization of success, reasons for error, or any other network service meta-data.

At block 508, the service distributes the log event data. The routine 500 terminates at block 510.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for managing trace data associated with network-based services, the system comprising:
   one or more computing devices having a processor and a memory, the one or more computing devices associated with execution of one or more network-based services, wherein the trace data comprises a plurality of trace span data, the plurality of trace span data generated from log data generated by individual network-based services; wherein the individual network-based services can generate the log data including unique trace identifiers identifying individual trace span data corresponding to the trace data;

one or more computing devices associated with a processor and a memory for executing computer-executable instructions to implement a trace generation service, wherein the trace generation service is configured to:

obtain first log data corresponding to execution of a first network-based service, wherein at least one log event in the first log data includes a generated unique trace identifier, wherein the unique trace identifier associates data generated by one or more network services corresponding to trace span data;

process the first log data to identify the generated unique trace identifier included in the first log data to generate a first trace span associated with the generated unique trace identifier;

obtain second log data corresponding to execution of a second network-based service, wherein at least one log event in the second log data includes the generated unique trace identifier;

process the second log data to identify the generated unique trace identifier included in the second log data to generate a second trace span associated with the generated unique trace identifier;

construct trace data associated with the generated unique trace identifier, the constructed trace data including at least the first trace span data generated from the first log data and the second trace span data generated from the second log data; and distribute the constructed trace data.

2. The system as recited claim 1, wherein individual log event data included in at least one of the first log data or the second log data includes a resource identifier, time of execution, characterization of success, reasons for error, or network service meta-data.

3. The system as recited in claim 1, wherein the generated unique trace identifier corresponds to a numeric identifier.

4. The system as recited in claim 3, wherein the numeric identifier included in a first portion of-the generated unique trace identifier is common to all network services.

5. The system as recited in claim 1, wherein the individual log event data further includes a service identifier and timing information associated with the execution of a service.

6. The system as recited in claim 5, wherein the service identifier and timing information is not common to all network services.

7. The system as recited in claim 6, wherein the timing information includes a start time of execution and an end time of execution.

8. The system as recited in claim 1, wherein the trace generation service causes execution of a trace data processing service.

9. The system as recited in claim 1, wherein the trace generation service generates the unique trace identifier.

10. A method for generating trace data for network-based services comprising:

obtaining, by a trace generation service, log data corresponding to execution of one or more network-based services, wherein individual log event data in the log data includes information associated with a generated trace identifier and wherein the individual log event data is generated by a network-based service during execution of the service;

processing, by the trace generation service, the log data to identify the trace identifier included in the log data to generate individual trace spans associated with the generated trace identifier;

constructing, by the trace generation service, trace data associated with the generated trace identifier, the constructed trace data including at least the individual trace span data generated from the log data; and distributing, by the trace generation service, the constructed trace data.

11. The method of claim 10 further comprising generating the trace identifier for associating with data generating by one or more network services.

12. The method as recited claim 10, wherein individual log event data included the log data includes a resource identifier, time of execution, characterization of success, reasons for error, or network service meta-data.

13. The method as recited in claim 10, wherein the generated trace identifier corresponds to a unique numeric identifier.

14. The method as recited in claim 13, wherein the unique numeric identifier is common to all network services.

15. The method as recited in claim 10, wherein the log data further includes a service identifier and timing information associated with the execution of the service.

16. The method as recited in claim 15, wherein the timing information includes a start time of execution and an end time of execution.

17. The method as recited in claim 10 further comprising causing execution of a trace data processing service to process the distributed constructed trace data.

18. A method for constructing trace data for network-based services comprising:

accessing, by a trace generation service, log data corresponding to execution of one or more network-based services, wherein individual log event data in the log data includes information associated with a trace identifier and wherein the individual log event data is generated by a network-based service during execution of the service;

processing, by the trace generation service, the log data to identify the generated trace identifier included in the log data to generate identified trace span data;

constructing, by the trace generation service, trace data associated with the generated trace identifier, the constructed trace data including at least the identified trace span data generated from the log data; and causing, by the trace generation service, a processing of the constructed trace data.

19. The method as recited claim 18, wherein generating the log data includes generating individual log event data including a resource identifier, time of execution, characterization of success, reasons for error, or network service meta-data.

20. The method as recited in claim 18, wherein the trace identifier corresponds to a numeric identifier common to all network services.

21. The method as recited in claim 18, wherein the individual log event data further includes timing information and wherein the numeric identifier and the timing information are not common to all network services.

22. The method as recited in claim 21, wherein the timing information included includes a start time of execution and an end time of execution.

23. The method as recited in claim 18, wherein causing, by the trace generation service, a processing of the constructed trace data includes transmitting the constructed trace data to a trace data processing service.

\* \* \* \* \*

UNITED STATES PATENT AND TRADEMARK OFFICE
CERTIFICATE OF CORRECTION

| | | |
|---|---|---|
| PATENT NO. | : 11,797,418 B1 | |
| APPLICATION NO. | : 17/643154 | |
| DATED | : October 24, 2023 | |
| INVENTOR(S) | : Nizar Tyrewalla et al. | |

It is certified that error appears in the above-identified patent and that said Letters Patent is hereby corrected as shown below:

In the Specification

In Column 6, Line 1, delete "110. ." and insert --110.--.

In the Claims

In Column 11, Claim 2, Line 35, delete "claim" and insert --in claim--.

In Column 12, Claim 12, Line 15 (Approx.), delete "claim" and insert --in claim--.

In Column 12, Claim 19, Line 51, delete "claim" and insert --in claim--.

Signed and Sealed this
Sixth Day of February, 2024

Katherine Kelly Vidal
*Director of the United States Patent and Trademark Office*